US009900180B2

(12) United States Patent
Han et al.

(10) Patent No.: US 9,900,180 B2
(45) Date of Patent: Feb. 20, 2018

(54) INFORMATION PROCESSING METHOD AND SWITCH

(71) Applicant: Lenovo (Beijing) Co., Ltd., Beijing (CN)

(72) Inventors: Xiaolei Han, Beijing (CN); Jie Yang, Beijing (CN); Liangliang Ma, Beijing (CN); Jun Liu, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 185 days.

(21) Appl. No.: 14/835,686

(22) Filed: Aug. 25, 2015

(65) Prior Publication Data

US 2016/0277263 A1 Sep. 22, 2016

(30) Foreign Application Priority Data

Mar. 20, 2015 (CN) .......................... 2015 1 0126082

(51) Int. Cl.
*H04L 12/26* (2006.01)
*H04L 12/46* (2006.01)
*H04L 12/24* (2006.01)

(52) U.S. Cl.
CPC .......... *H04L 12/4641* (2013.01); *H04L 41/24* (2013.01); *H04L 43/0811* (2013.01)

(58) Field of Classification Search
None
See application file for complete search history.

(56) References Cited

U.S. PATENT DOCUMENTS

| 6,996,058 | B2 * | 2/2006 | Foster | H04L 49/357 370/228 |
| 9,083,718 | B1 * | 7/2015 | Bosak | H04L 67/1046 |
| 9,536,119 | B2 * | 1/2017 | DeCusatis | G06K 7/10158 |
| 2004/0006612 | A1 * | 1/2004 | Jibbe | H04L 41/0853 709/223 |
| 2004/0228290 | A1 * | 11/2004 | Graves | G06F 17/30067 370/257 |
| 2005/0111491 | A1 * | 5/2005 | Caveney | H04M 3/229 370/475 |
| 2005/0159036 | A1 * | 7/2005 | Caveney | H01R 29/00 439/188 |
| 2007/0207666 | A1 * | 9/2007 | Caveney | H04Q 1/136 439/540.1 |

(Continued)

*Primary Examiner* — Natisha Cox
(74) *Attorney, Agent, or Firm* — Brinks Gilson & Lione; G. Peter Nichols (57) ABSTRACT

An information processing method and a switch are described, in which the method includes the steps of acquiring a first information transmitted by the server through the first connection; deciding whether a first parameter in the first information matches a first predetermined parameter, the first parameter including at least Virtual Local Area Network (VLAN) identification information and Internet Protocol (IP) address information corresponding to a network port into which the first connection line is plugged on the server; determining the first connection line connected at the switch is in a wrong connection when it is decided that the first parameter does not match the first predetermined parameter. The recognition whether a connection of a network cable plugged in a network port of the server and the port of the switch are correct may be realized automatically.

6 Claims, 3 Drawing Sheets

(56) References Cited

U.S. PATENT DOCUMENTS

| | | | |
|---|---|---|---|
| 2012/0079139 A1* | 3/2012 | Sonokawa | H04L 43/0811 710/16 |
| 2014/0372634 A1* | 12/2014 | Langgood | G06F 11/3051 710/16 |
| 2016/0173723 A1* | 6/2016 | Kobayashi | H04N 1/4052 358/3.03 |

* cited by examiner

Fig. 5

INFORMATION PROCESSING METHOD AND SWITCH

This application claims priority to Chinese patent application No. 201510126082.9 filed on Mar. 20, 2015, the entire contents of which are incorporated herein by reference.

The disclosure is related to information processing technology, in particular, to information processing method and switch.

BACKGROUND

A server used in communication system is configured with a plurality of network cards of which each corresponds to one network port so as to be plugged by a network cable, and the other terminal of the network cable is usually plugged in certain port of a switch which is responsible for forwarding data of the server. At present, in order to detect whether the network cable plugged in the network port of the server is plugged in a correct switch or a correct port of a switch, a method is employed as follows: plugging tentatively a network cable plugged in a network port on a server into certain port of a switch, and then performing a ping operation on an Internet Protocol (IP) address on the network port. The connection of the port of the switch with the network port is correct if the ping operation is validated; plugging the network cable in certain port of next switch if the ping operation is not validated, and repeating continuously the method as described above, until the ping operation is validated. The method as described above is adapted comparatively to a network in which each of the numbers of the servers and switches are not massive, whereas the feasibility thereof is not satisfactory in terms of a system in which there are numerous servers and switches, e.g., a cloud computing system; further, the ping operation is a manual operation, and the operator need to check the result of ping operation on the server and change the network cable to another port of the switch or another switch manually, hence an efficient productivity cannot be achieved by the system if the aforementioned scheme is applied to the cloud computing system.

SUMMARY

To solve the technical issues existing in the related art, there is provided an information processing method and a switch capable of implementing an automated recognition by which it is decided whether the network cable plugged in a network port of the server makes a correct connection with the switch in the embodiments of the disclosure, and the accuracy of recognition is high with less manual intervening.

The technical scheme of the embodiment of the disclosure is implemented as follows.

There is provided an information processing method applied to a first device making a first connection with a second device through a first connection line and performing communication through the first connection in an embodiment of the disclosure. The method comprises the steps of: acquiring a first information transmitted by the second device through the first connection; deciding whether a first parameter in the first information matches a first predetermined parameter, the first parameter including at least Virtual Local Area Network (VLAN) identification information and Internet Protocol (IP) address information corresponding to a network port into which the first connection line is plugged on the second device; and determining the first connection line connected at the first device is in a wrong connection when it is decided that the first parameter does not match the first predetermined parameter.

In the scheme as describe above, the method further comprises the steps of determining the first connection line connected at the first device is in a correct connection when it is decided that the first parameter matches the first predetermined parameter, and sustaining the connection by the first connection line.

In the scheme as describe above, the method further comprises the steps of receiving the first information which is a packetized data packet; parsing the first information to obtain the VLAN identification information and the IP address information; and accordingly, deciding whether the first parameter in the first information matches the first predetermined parameter comprises the steps of deciding whether the VLAN identification information is identical to a first predetermined sub-parameter; deciding whether the IP address information is identical to a second predetermined sub-parameter; determining the first parameter does not match the first predetermined parameter when it is decided that the VLAN identification information is different from the first predetermined sub-parameter and the IP address information is different from the second predetermined sub-parameter, or the VLAN identification information is identical to the first predetermined sub-parameter and the IP address information is different from the second predetermined sub-parameter, or the VLAN identification information is different from the first predetermined sub-parameter and the IP address information is identical to the second predetermined sub-parameter; and accordingly determining the first parameter matches the first predetermined parameter when it is decided that the VLAN identification information is identical to the first predetermined sub-parameter and the IP address information is identical to the second predetermined sub-parameter.

In the scheme as describe above, the device further comprises a first indicator; the first indicator is capable of working in a first and a second states.

When it is decided that the first parameter matches the first predetermined parameter, the method further comprises the steps of controlling the first indicator to be in the first state; transmitting a first instruction so that a second indicator of the second device is in the first state, the second indicator being capable of working in the first and the second states; and when it is decided that the first parameter does not match the first predetermined parameter, controlling the first indicator to be in the second state; and transmitting a second instruction to the second device, so that the second indicator of the second device is in the second state. Wherein the values of illumination of the first and second indicators in the first state are different from those in the second state.

In the scheme as describe above, when it is decided that the first parameter does not match the first predetermined parameter, the first device generates and outputs a first warning data.

It is also provided a device making a first connection with a second device through a first connection line and performing communication through the first connection in the embodiment of the disclosure. The device comprises: a first acquisition unit for acquiring a first information transmitted by the second device through the first connection; a first decision unit for deciding whether a first parameter in the first information matches a first predetermined parameter, the first parameter including at least Virtual Local Area Network (VLAN) identification information and Internet Protocol (IP) address information corresponding to a network port into which the first connection line is plugged on the second device; and a first determination unit for determining the first connection line connected at the device is in a wrong connection when the first decision unit decides that the first parameter does not match the first predetermined parameter.

In the scheme as describe above, the device further comprises a second determination unit for determining the first connection line connected at the device is in a correct connection when the first decision unit decides that the first parameter matches the first predetermined parameter, and sustaining the connection by the first connection line.

In the scheme as describe above, the first acquisition unit is configured for receiving a first information which is a packetized data packet; and parsing the first information to obtain the VLAN identification information and the IP address information; the first decision unit is configured for deciding whether the VLAN identification information is identical to a first predetermined sub-parameter; and deciding whether the IP address information is identical to a second predetermined sub-parameter; the first determination unit is configured for determining the first parameter does not match the first predetermined parameter when the first decision unit decides that the VLAN identification information is different from the first predetermined sub-parameter and the IP address information is different from the second predetermined sub-parameter, or the VLAN identification information is identical to the first predetermined sub-parameter and the IP address information is different from the second predetermined sub-parameter, or the VLAN identification information is different from the first predetermined sub-parameter and the IP address information is identical to the second predetermined sub-parameter; and the second determination unit is configured for determining the first parameter matches the first predetermined parameter when the first decision unit decides that the VLAN identification information is identical to the first predetermined sub-parameter and the IP address information is identical to the second predetermined sub-parameter.

In the scheme as describe above, the device further comprises a first indicator; and the first indicator is capable of working in a first and a second states.

The electronic device further comprises: a first control unit for controlling the first indicator to be in a first state when the first decision unit decides that the first parameter matches the first predetermined parameter; a first transmission unit configured for transmitting a first instruction so that a second indicator of the second device is in the first state, the second indicator being capable of working in the first and the second states; a second control unit configured for controlling the first indicator to be in a second state when the first decision unit decides that the first parameter does not match the first predetermined parameter; and a second transmission unit configured for transmitting a second instruction to the second device, so that the second indicator of the second device is in the second state; and wherein the values of illumination of the first and second indicators in the first state are different from those in the second state.

In the scheme as describe above, the device further comprises: a first outputting unit configured for generating and outputting a first warning data when the first decision unit decides that the first parameter does not match the first predetermined parameter.

In the information processing method and the device provided in the embodiment of the disclosure, the method is applied to the device making a first connection with the second device through a first connection line and performing communication through the first connection; the method comprises steps of acquiring a first information transmitted by the second device through the first connection; deciding whether a first parameter in the first information matches a first predetermined parameter, the first parameter including at least Virtual Local Area Network (VLAN) identification information and Internet Protocol (IP) address information corresponding to a network port into which the first connection line is plugged on the server; and determining the first connection line connected at the second is in a wrong connection when it is decided that the first parameter does not match the first predetermined parameter. Utilizing the scheme, it is capable of implementing a recognition whether the network cable plugged in the network port of the second device and the port of the first device are correct automatically, and the accuracy of recognition is high with less manual intervening.

DETAILED DESCRIPTION

The preferred embodiments of the disclosure will be described in detail with reference to the accompany drawings as follows. It is appreciated that the preferred embodiments described hereinafter are merely intended to interpret and explain the disclosure, and not any limitation thereto.

Method Embodiment 1

The first embodiment of the information processing method provided by the disclosure is applied to a switch which can make a first connection with a server through a first connection line and perform communication through the first connection. The first connection line is a network cable.

Figure 1:
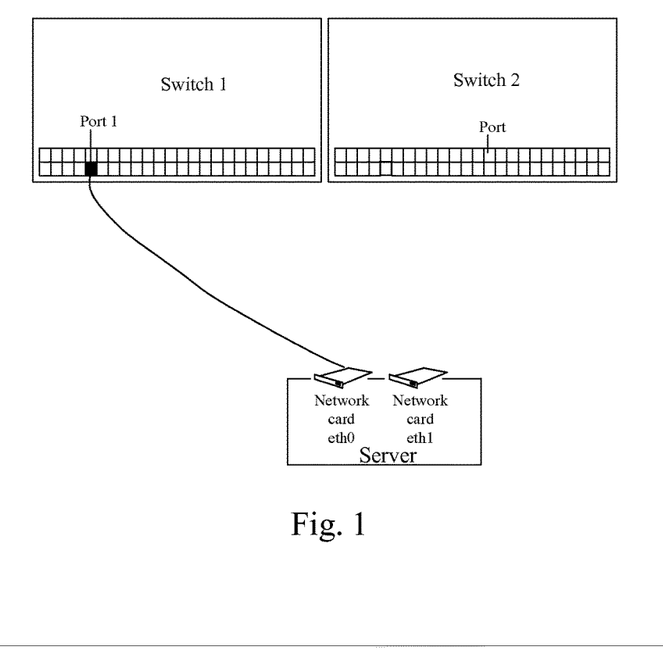
FIG. 1 is a schematic diagram of an application scenario provided by an embodiment of the disclosure.

There are one server and two switches (switch 1 and switch 2), as shown in FIG. 1. The server is provided with two network cards eth0 and eth1 each corresponding to a network port, and each of the switches is provided with a plurality of ports. Taking the case that one terminal of the network cable is plugged in the network port corresponding to the network card eth0, and the other terminal of the network cable is plugged in a port, such as the port 1, of the switch 1 as an example.

Figure 2:
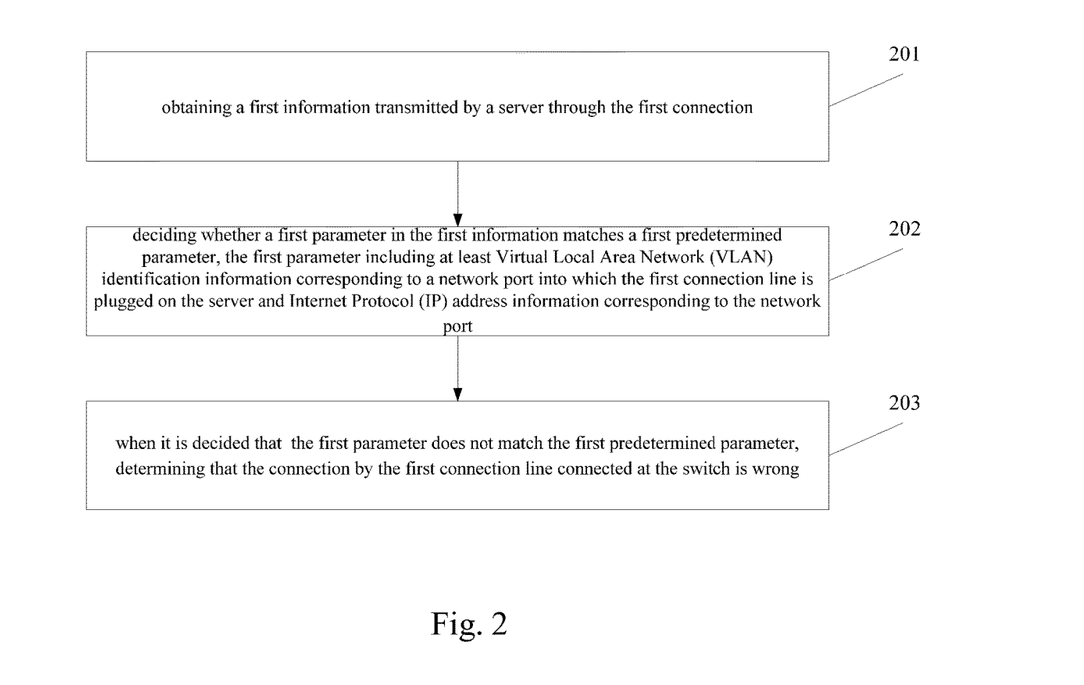
FIG. 2 is a schematic flowchart of an implementation of a first embodiment of the information processing method provided by the disclosure.

FIG. 2 is the schematic flowchart of the implementation of the first embodiment of the information processing method provided by the disclosure. As shown in FIG. 2, the method comprises the following steps.

Step 201: acquiring a first information transmitted by the server through the first connection.

Herein, when the network cable is plugged in the network port corresponding to the network card eth0 of the server and a port of the switch 1, the network cable is utilized by the server to transmit the Generic Attribute Registration Protocol (GARP) data packet to the switch 1 every certain time period, e.g., 3 s, and the first information is the GARP data packet. For the GARP data packet, the transmission of the data packet can be performed by employing a datagram transmission format in the related art.

Step 202: deciding whether a first parameter in the first information matches a first predetermined parameter, the first parameter including at least Virtual Local Area Network (VLAN) identification information and the Internet Protocol (IP) address information corresponding to a network port into which the first connection line is plugged on the server.

Herein, the first parameter is carried in the GARP data packet; the first parameter comprises VLAN identification information and the IP address information corresponding to the network port into which the network cable is plugged. After the two pieces of information are received by the switch 1, it is decided whether the received VLAN identification information is identical to VLAN identification information stored in advance by the switch 1 and whether the received IP address information is identical to the IP address information stored in advance by the switch 1.

Step 203: determining the first connection line connected at the switch is in a wrong connection when it is decided that the first parameter does not match the first predetermined parameter.

Herein, when the switch 1 decides that one of the received two pieces of information is different from the respective information stored in advance, it is determined that a wrong connection occurs for the network cable connected between the server and the port 1 of the switch 1, that is, the other terminal of the network cable should not be plugged in the port 1 of the switch 1, and should be plugged in other ports rather than port 1 in the switch 1 or certain port on other switches, e.g., the switch 2.

It can be seen in the embodiment, it is decided by the switch whether a first parameter received from the server matches a first predetermined parameter stored in advance by the switch to determine whether the network cable is connected on the correct switch, and the recognition whether the network cable plugged in the network port of the server and the port of the switch are correct is achieved automatically; less manual intervening is required and the accuracy of the recognition is high in the embodiment.

Method Embodiment 2

The second embodiment of the information processing method provided by the disclosure is applied to a switch which can make a first connection with a server through a first connection line and perform communication through the first connection. The first connection line is a network cable.

There are one server and two switches (a switch 1 and a switch 2), as shown in FIG. 1. The server is provided with two network cards eth0 and eth1 each corresponding to a network port, and each of the switches is provided with a plurality of ports. Taking the case that one terminal of the network cable is plugged in a network port corresponding to the network card eth0, and the other terminal of the network cable is plugged on a port, such as a port 1, of the switch 1 as an example.

Figure 3:
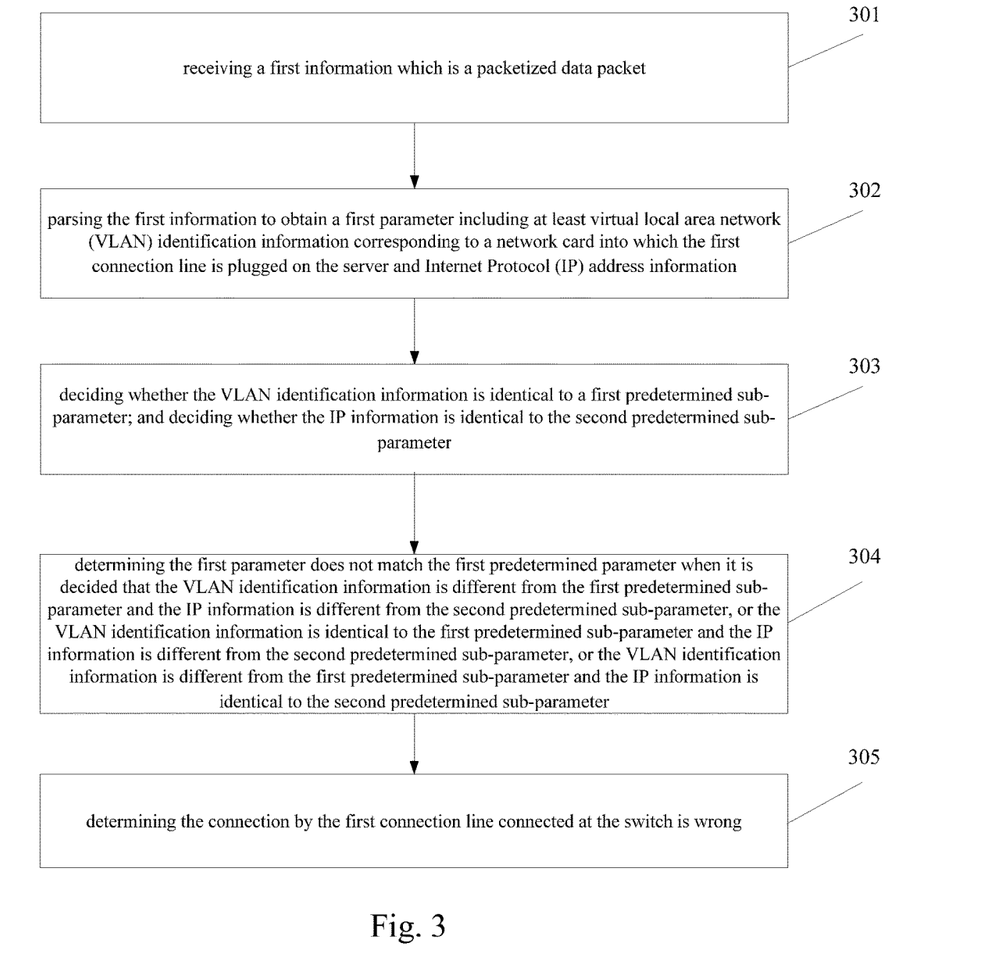
FIG. 3 is a schematic flowchart of an implementation of a second embodiment of the information processing method provided by the disclosure.

FIG. 3 is the schematic flowchart of the implementation of the second embodiment of the information processing method provided by the disclosure. As shown in FIG. 3, the method comprises following the steps.

Step 301: receiving a first information which is a data packet.

Herein, when the network cable is plugged in the network port corresponding to the network card eth0 of the server and a port of the switch 1, the network cable is utilized by the server to transmit the Generic Attribute Registration Protocol (GARP) data packet to the switch 1 every certain time period, e.g., 3 s, and the data packet is received by the switch 1, the first information is the GARP data packet. For the GARP data packet, the transmission of the data packet can be performed by employing a datagram transmission format in the related art.

Step 302: parsing the first information to obtain a first parameter including at least Virtual Local Area Network (VLAN) identification information corresponding to the network port of the server into which the first connection line is plugged and the Internet Protocol (IP) information corresponding to the network port.

Herein, after the GARP data packet is received by the switch, the GARP data packet is parsed to obtain the VLAN identification information corresponding to the network port into which the network cable is plugged on the server and the IP address information corresponding to the network port.

Step 303: deciding whether the VLAN identification information is identical to a first predetermined sub-parameter; deciding whether the IP information is identical to a second predetermined sub-parameter.

Herein, the switch 1 decides whether the received VLAN identification information is identical to the VLAN identification information stored in advance by the switch 1, and decides whether the received IP address information is identical to the IP address information stored in advance by the switch 1; wherein the first predetermined sub-parameter is the VLAN identification information stored in advance by the switch 1, and the second predetermined sub-parameter is the IP address information stored in advance by the switch 1.

Step 304: determining the first parameter does not match the first predetermined parameter when it is decided that the VLAN identification information is different from the first predetermined sub-parameter and the IP information is different from the second predetermined sub-parameter, or the VLAN identification information is identical to the first predetermined sub-parameter and the IP information is different from the second predetermined sub-parameter, or the VLAN identification information is different from the first predetermined sub-parameter and the IP information is identical to the second predetermined sub-parameter.

Herein, deciding whether the received VLAN identification information is identical to the VLAN identification information stored in advance thereby is deemed as a first event, and deciding of whether the received IP address information is identical to the IP address information stored in advance thereby is deemed as a second event; in the decisions on those two events, it may be determined that the first parameter does not match the first predetermined parameter as long as one of the decision results is not identical.

Step 305: determining the first connection line connected at the switch is in a wrong connection.

Herein, when the first parameter does not match the first predetermined parameter, it is determined that the wrong connection occurs at the network cable connected between the server and the port 1 of the switch 1, that is, the other terminal of the network cable should not be plugged in the port 1 of the switch 1, and should be plugged in other ports rather than the port 1 of the switch 1 or certain port of other switches, e.g., the switch 2.

In one embodiment of the disclosure, when it is decided that the VLAN identification information is identical to the first predetermined sub-parameter and the IP information is identical to the second predetermined sub-parameter, it is determined that the first parameter matches the first predetermined parameter, it is determined that the first connection line at the switch is in correction connection, and the connection by the first connection line is sustained.

Herein, when it is decided by the switch 1 that received VLAN identification information is identical to the VLAN identification information stored in advance thereby and the received IP address information is also identical to the IP address information stored in advance thereby, it is determined that the first parameter matches the first predetermined parameter and the network cable connected between the server and the port 1 of the switch 1 is in a correct connection, i.e., it is correct that the other terminal of the network cable is plugged in the port 1 of the switch 1, and the correct connection by the network cable is sustained, such that the data transmission is performed between the server and the port 1 of the switch 1 subsequently.

The switch further comprises a first indicator; the first indicator is capable of working in a first and a second states; the first indicator is an indication light on the switch. The first and the second states are the events in which the indication light is lighted as green and red respectively, and vice versa.

In another embodiment of the disclosure, when it is decided that the first parameter matches the first predetermined parameter, the method further comprises the steps of controlling the first indicator to be in the first state; transmitting a first instruction so that a second indicator of the server is in the first state, the second indicator being capable of working in the first and the second states; controlling the first indicator to be in the second state when it is decided that the first parameter does not match the first predetermined parameter; transmitting a second instruction to the server, so that the second indicator of the server is in the second state; generating and outputting a first warning data by the switch. The values of illumination of the first and second indicators in the first state are different from those in the second state.

Herein, when the first parameter matches the first predetermined parameter, i.e., the network cable connected between the server and the port 1 of the switch 1 is in the correct connection, the switch controls the indication light thereof to be lighted as normal (e.g., lighted as green), and feedbacks an instruction indicating the network cable is in a correct connection to the server, and the server lights the indication light thereof as normal, i.e., as green, after the instruction is received by the server. When the first parameter does not match the first predetermined parameter, that is, the network cable connected between the server and the port 1 of the switch 1 is in a wrong connection, the switch controls the indication light thereof to be lighted as abnormal, e.g., as red, and feedbacks an instruction indicating the connection by the network cable is wrong to the server, and the server lights the indication light thereof as abnormal, e.g., as red, after the instruction is received by the server. Of course, in a case where the connection by the network cable is wrong, each of the indication lights of the switch 1 and the server may be flickered at a predetermined times, e.g., 10 times; in addition, the switch 1 may generate and output, e.g., output in a form of voice, a warning data, in order to reminder the maintenance personnel to unplug the network cable from the switch 1.

It can be seen in the embodiment of the disclosure, it is decided by the switch whether the first parameter received from the server matches the first predetermined parameter stored in advance by the switch to determine whether the network cable is connected on the correct switch, and the automated recognition by which the correct connection between the network cable plugged in the network port of the server and the port of the switch is made is achieved; less manual intervening is required and the accuracy of recognition is high in the embodiment, as compared with the manual operation, e.g., the ping operation, in the related art.

Device Embodiment 1

There is provided the first embodiment of the switch in the disclosure, and the switch can make a first connection with a server through a first connection line and perform communication through the first connection. The first connection line is a network cable.

There are one server and two switches (switch 1 and switch 2), as shown in FIG. 1. The server is provided with two network cards eth0 and eth1 each corresponding to a network port, and each of the switches is provided with a plurality of ports. Taking the case that one terminal of the network cable is plugged in a network port corresponding to the network card eth0, and the other terminal of the network cable is plugged in a port, such as a port 1, of the switch 1 as an example.

Figure 4:
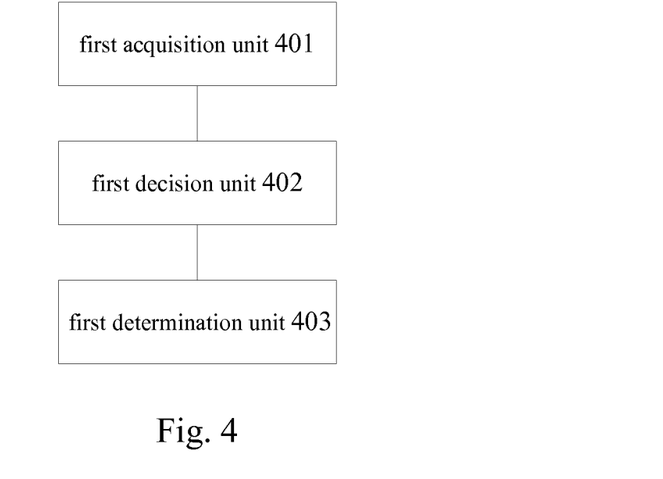
FIG. 4 is a schematic diagram of the composition of the structure of a first embodiment of the switch provided by the disclosure.

FIG. 4 is the schematic diagram of the composition of the structure of the first embodiment of the switch provided by the disclosure. As shown in FIG. 4, the switch comprises: a first acquisition unit 401, a first decision unit 402, and a first determination unit 403.

The first acquisition unit 401 is configured for acquiring a first information transmitted by the server through the first connection.

Herein, when the network cable is plugged in the network port corresponding to the network card eth0 of the server and a port of the switch 1, the network cable is utilized by the server to transmit the Generic Attribute Registration Protocol (GARP) data packet to the switch 1 every certain time period, e.g., 3 s, and the data packet is received by the switch 1, in particular, the first acquisition unit 401, the first information is the GARP data packet. For the GARP data packet, the transmission of the data packet can be performed by employing a datagram transmission format in the related art.

The first decision unit 402 is configured for deciding whether a first parameter in the first information matches a first predetermined parameter, the first parameter including at least Virtual Local Area Network (VLAN) identification information and Internet Protocol (IP) address information corresponding to a network port into which the first connection line is plugged on the server.

Herein, the first parameter is carried in the GARP data packet; the first parameter comprises VLAN identification information and IP address information corresponding to the network port into which the network cable is plugged. After the two pieces of information are received by the switch 1, in particular, the first acquisition unit 401, the first decision unit 402 decides whether the received VLAN identification information is identical to the VLAN identification information stored in advance by the switch 1 and whether the received IP address information is identical to the IP address information stored in advance by the switch 1.

The first determination unit 403 is configured for determining that the first connection line connected at the switch is in a wrong connection, when the first decision unit 402 decides that the first parameter does not match the first predetermined parameter.

Herein, as long as the first decision unit 402 decides that any one of the information is different from the corresponding information stored in advance in the two pieces of received information, it is determined that a wrong connection occurs at the network cable connected between the server and the switch 1, that is, the other terminal of the network cable should not be plugged in the port 1 of the switch 1, and should be plugged in other ports rather than the port 1 in the switch 1 or certain port on other switches, e.g., the switch 2.

It can be seen in the embodiment, the switch decides whether the first parameter received from the server matches the first predetermined parameter stored in advance by the switch to determine whether the network cable is connected on a correct switch, and the recognition whether the network cable plugged in the network port of the server and the port of the switch are correct connection is achieved automatically; less manual intervening is required and the accuracy of the recognition is high in the embodiment.

Device Embodiment 2

It is provided the second embodiment of the switch in the disclosure, and the switch can make a first connection with a server through a first connection line and perform communication through the first connection. The first connection line is a network cable.

There are one server and two switches (switch 1 and switch 2), as shown in FIG. 1. The server is provided with two network cards eth0 and eth1 each corresponding to a network port, and each of the switches is provided with a plurality of ports. Taking the case that one terminal of the network cable is plugged in a network port corresponding to the network card eth0, and the other terminal of the network cable is plugged in a port, such as a port 1, of the switch 1 as an example.

Figure 5:
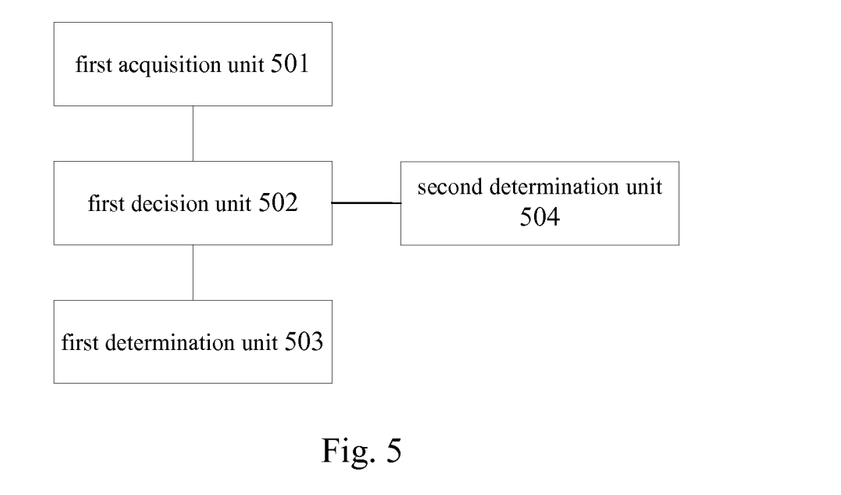
FIG. 5 is a schematic diagram of the composition of the structure of a second embodiment of the switch provided by the disclosure.

FIG. 5 is the schematic diagram of the composition of the structure of the second embodiment of the switch provided by the disclosure. As shown in FIG. 5, the switch comprises a first acquisition unit 501, a first decision unit 502, and a first determination unit 503.

The first acquisition unit 501 is configured for receiving a first information which is a data packet; parsing the first information to obtain a first parameter including at least Virtual Local Area Network (VLAN) identification information corresponding to the network port of the server into which the first connection line is plugged and Internet Protocol (IP) information corresponding to the network port.

Herein, when the network cable is plugged in the network port corresponding to the network card eth0 of the server and a port of the switch 1, the network cable is utilized by the server to transmit the Generic Attribute Registration Protocol (GARP) data packet to the switch 1 every certain time period, e.g., 3 s, and the data packet is received by the switch 1, in particular, the first acquisition unit 501, the first information is the GARP data packet. After the GARP data packet is received by the switch, in particular, by the first acquisition unit 501, the GARP data packet is parsed to obtain VLAN identification information corresponding to a network port into which the network cable is plugged on the server and IP address information corresponding to the network port. For the GARP data packet, the transmission of the data packet can be performed by employing a datagram transmission format in the related art.

The first decision unit 502 is configured for deciding whether the VLAN identification information is identical to a first predetermined sub-parameter; deciding whether the IP information is identical to a second predetermined sub-parameter.

Herein, the switch 1, in particular, the first decision unit 502 decides whether received VLAN identification information is identical to the VLAN identification information stored in advance by the switch 1 and whether received IP address information is identical to the IP address information stored in advance by the switch 1; wherein the first predetermined sub-parameter is the VLAN identification information stored in advance by the switch 1, and the second predetermined sub-parameter is the IP address information stored in advance by the switch 1.

The first determination unit 503 is configured for determining the first connection line connected at the switch is in a wrong connection, when the first decision unit 502 decides that the VLAN identification information is different from the first predetermined sub-parameter and the IP information is different from the second predetermined sub-parameter, or the VLAN identification information is identical to the first predetermined sub-parameter and the IP information is different from the second predetermined sub-parameter, or the VLAN identification information is different from the first predetermined sub-parameter and the IP information is identical to the second predetermined sub-parameter.

Herein, deciding whether the received VLAN identification information is identical to the VLAN identification information stored in advance thereby is deemed as a first event, and deciding whether the received IP address information is identical to the IP address information stored in advance thereby is deemed as a second event; it may be determined that the first parameter does not match the first predetermined parameter by the first decision unit 502 as long as one of the decision results is decided to be different. The first determination unit 503 determines that the incorrect connection occurs at the network cable connected between the server and the port 1 of the switch 1, that is, the other terminal of the network cable should not to be plugged in the port 1 of the switch 1, and should be plugged in other ports rather than the port 1 in the switch 1 or certain port on other switches, e.g., the switch 2.

In an embodiment of the disclosure, as shown in FIG. 5, the switch further comprises: a second determination unit 504, which is configured for determining that the first parameter matches the first predetermined parameter and whether the first connection line connected at the switch is in a correct connection. When the first decision unit 502 decides that the VLAN identification information is identical to the first predetermined sub-parameter and the IP information is identical to the second predetermined sub-parameter, and the connection by the first connection line is sustained.

Herein, when the switch 1, in particular, the first decision unit 502 decides that the received VLAN identification information is identical to the VLAN identification information stored in advance thereby and the received IP address information is also identical to the IP address information stored in advance thereby, it is determined that the first parameter matches the first predetermined parameter and the second determination unit 504 determines that the network cable connected between the server and the port 1 of the switch 1 is in a correct connection, i.e., it is correct that the other terminal of the network cable is plugged in the port 1 of the switch 1, and the correct connection by the network cable is sustained such that the data transmission is performed between the server and the port 1 of the switch 1 subsequently.

The switch further comprises a first indicator; the first indicator is capable of working in a first and a second states; the first indicator is an indication light on the switch. The first and the second states are the events in which the indication light is lighted as green and red respectively, and vice versa.

The electronic device further comprises: a first control unit, a first transmission unit, a second control unit, a second transmission unit, and a first outputting unit, of which none is shown in FIG. 5.

The first control unit is configured for controlling the first indicator to be in the first state when the first decision unit 502 decides that the first parameter matches the first predetermined parameter.

The first transmission unit is configured for transmitting a first instruction so that a second indicator of the server is in the first state, the second indicator being capable of working in the first and the second states.

The second control unit is configured for controlling the first indicator to be in a second state when the first decision unit decides that the first parameter does not matched the first predetermined parameter.

The second transmission unit is configured for transmitting a second instruction to the server, so that the second indicator of the server is in the second state; wherein the values of illumination of the first and the second indicators in the first state is different from those in the second state.

The first outputting unit is configured for generating and outputting a first warning data when the first decision unit 502 decides that the first parameter does not matched the first predetermined parameter.

Herein, when the first decision unit 502 decides that the first parameter matches the first predetermined parameter, i.e., the network cable connected between the server and the port 1 of the switch 1 is in the correct connection, the switch, in particular, the first control unit, controls the indication light thereof to be lighted as normal (e.g., lighted as green), and the first transmission unit feedbacks an instruction indicating the network cable is in a correct connection to the server, and the server lights the indication light thereof as normal, i.e., as green, after the instruction is received by the server. When the first decision unit 502 decides that the first parameter does not matched with the first predetermined parameter, that is, the network cable connected between the server and the port 1 of the switch 1 is in the wrong connection, the switch, in particular, the second control unit, controls the indication light thereof to be lighted as abnormal, e.g., as red, and the second transmission unit feedbacks an instruction indicating the connection by the network cable is incorrect to the server, and the server lights the indication light thereof as abnormal, e.g., as red, after the instruction is received by the server. Of course, in a case where the connection by the network cable is incorrect, each of the indication lights of the switch 1 and the server may be flickered at a predetermined times, e.g., 10 times; Furthermore, the switch 1, in particular, the first outputting unit, may generate and output, e.g., in form of voice, a warning data, in order to reminder the maintenance personnel to unplug the network cable from the switch 1.

It can be seen in the embodiment, the switch decides whether a first parameter received from the server matches a first predetermined parameter stored in advance by the switch to determine whether the network cable is connected on a correct switch, the automated recognition by which it is decided whether the connection of the network cable plugged in the network port of the server with the switch is correct is achieved; less manual intervening is required and the accuracy of recognition is high in the embodiment, as compared with the manual operation, e.g., the ping operation, in the related art.

It is to be appreciated that the device and method revealed in several embodiments provided by the application may be implemented by other means. The device embodiments as described above are merely illustrative, for example, the division of the unit is just a logic function division, and there may be other divisions upon implemented in practice, for example: a plurality of units or components may be combined or integrated into another system, or some features may be omitted or unexecuted. In addition, the mutual coupling between respective compositions, or the direct coupling, or the communicate connection as shown or discussed may be an indirect coupling or communication connection between the devices or units, and may be electrical, mechanical, or in other form.

The units illustrated to be individual means as described above may or may not be separated physically, and the means shown as the unit may or may not be a physical unit, that is, it may be located on a site, and may also be distributed over a plurality of network units. Part or all of the units therein may be selected in accordance with the actual requirement to implement the object of the scheme of the embodiment.

Moreover, all of the function units in the embodiments of the disclosure may be integrated in one processing unit, and each of the units may also be one unit individually, and two or more units may be integrated into one unit; the integrated units as describe above may be implemented by means of hardware, and may also be implemented by means of hardware and software functional units.

It is appreciated by those skilled in the art that all or part of the steps for implementing the method embodiment as described above may be completed by hardware related to program instructions, and the aforementioned program may be stored in a computer readable storage medium, and execute the steps comprising the method embodiment as described above when it is executed; and the aforementioned storage medium comprises the respective medium which may store the program code, such as a mobile storage device, a Read-Only Memory (ROM), a magnetic or optical disk, etc.

The description above is merely the detailed description of the disclosure, and the protection scope of the disclosure is not limited thereto. It is readily for those skilled in the art to contemplate the change or replacement encompassed within the protection scope of the disclosure without departing from the technical scope revealed in the disclosure. Therefore, the protection scope of the disclosure is in accordance with that of the claim.

The invention claimed is:

1. An information processing method, applied to a first device making a first connection with a second device through a first connection line and performing communication through the first connection; the method comprises steps of:

acquiring a first information which is a packetized data packet transmitted by the second device through the first connection;

deciding whether a first parameter in the first information matches a first predetermined parameter, the first parameter including at least Virtual Local Area Network (VLAN) identification information and Internet Protocol (IP) address information corresponding to a network port into which the first connection line is plugged on the second device; wherein deciding whether the first parameter in the first information matches the first predetermined parameter comprises the steps of:

parsing the first information to obtain the VLAN identification information and the IP address information;
deciding whether the VLAN identification information is identical to a first predetermined sub-parameter;
deciding whether the IP address information is identical to a second predetermined sub-parameter;
determining the first parameter does not match the first predetermined parameter when it is decided that the VLAN identification information is different from the first predetermined sub-parameter and the IP address information is different from the second predetermined sub-parameter, or VLAN identification information is identical to the first predetermined sub-parameter and the IP address information is different from the second predetermined sub-parameter, or the VLAN identification information is different from the first predetermined sub-parameter and the IP address information is identical to the second predetermined sub-parameter; and
accordingly, determining the first parameter matches the first predetermined parameter when it is decided that the VLAN identification information is identical to the first predetermined sub-parameter and the IP address information is identical to the second predetermined sub-parameter; and
determining the first connection line connected at the first device is in a wrong connection when it is decided that the first parameter does not match the first predetermined parameter
wherein the first device further comprises a first indicator: and the first indicator is capable of working in a first and a second states:
when it is decided that the first parameter matches the first predetermined parameter, the method further comprises the steps of
controlling the first indicator to be in the first state: and
transmitting a first instruction so that a second indicator of the second device is in the first state, the second indicator being capable of working in the first and the second states: and
when it is decided that the first parameter does not match the first predetermined parameter
controlling the first indicator to be in the second state:
transmitting a second instruction to the second device, so that the second indicator of the second device is in the second state: and
wherein the values of illumination of the first and second indicators in the first state are different from those in the second state.

2. The method according to claim 1 further comprising determining the first connection line connected at the first device is in a correct connection when it is decided that the first parameter matches the first predetermined parameter, and sustaining the connection by the first connection line.

3. The method according to claim 1, wherein, when it is decided that the first parameter does not match the first predetermined parameter, generating and outputting a first warning data by the first device.

4. A device making a first connection with a second device through a first connection line and performing communication through the first connection; the device comprising:

a first acquisition unit for acquiring a first information which is a packetized data packet transmitted by the second device through the first connection;
a first decision unit for deciding whether a first parameter in the first information matches a first predetermined parameter, the first parameter including at least Virtual Local Area Network (VLAN) identification information and Internet Protocol (IP) address information corresponding to a network port into which the first connection line is plugged on the second device; wherein
the first acquisition unit is configured for parsing the first information to obtain the VLAN identification information and the IP address information;
the first decision unit is configured for deciding whether the VLAN identification information is identical to a first predetermined sub-parameter; deciding whether the IP address information is identical to a second predetermined sub-parameter;
a first determination unit is configured for determining the first parameter does not match the first predetermined parameter when the first decision unit decides that the VLAN identification information is different from the first predetermined sub-parameter and the IP address information is different from the second predetermined sub-parameter, or the VLAN identification information is identical to the first predetermined sub-parameter and the IP address information is different from the second predetermined sub-parameter, or the VLAN identification information is different from the first predetermined sub-parameter and the IP address information is identical to the second predetermined sub-parameter; and
a second determination unit is configured for determining the first parameter matches the first predetermined parameter when the first decision unit decides that the VLAN identification information is identical to the first predetermined sub-parameter and the IP address information is identical to the second predetermined sub-parameter; and
the first determination unit determining the first connection line connected at the device is in a wrong connection when the first decision unit decides that the first parameter does not match the first predetermined parameter,
wherein, the device further comprises a first indicator: and the first indicator is capable of working in a first and a second states:
the electronic device further comprising:
a first control unit configured for controlling the first indicator to be in a first state when the first decision unit decides that the first parameter matches the first predetermined parameter:
a first transmission unit configured for transmitting a first instruction so that a second indicator of the second device is in the first state, the second indicator being capable of working in the first and the second states:
a second control unit configured for controlling the first indicator to be in a second state when the first decision unit decides that the first parameter does not match the first predetermined parameter: and a second transmission unit configured for transmitting a second instruction to the second device, so that the second indicator of the second device is in the second state: and wherein the values of illumination of the first and second indicators in the first state are different from those in the second state.

5. The device according to claim 4, wherein the device further comprises the second determination unit determining the first connection line connected at the device is in a correct connection when the first decision unit decides that the first parameter matches the first predetermined parameter, and sustaining the connection by the first connection line.

6. The device according to claim 4, further comprising a first outputting unit configured for generating and outputting a first warning data when the first decision unit decides that the first parameter does not match the first predetermined parameter.

* * * * *